3,630,945
DIVALENT EUROPIUM ACTIVATED ALKALINE EARTH ALUMINUM FLUORIDE LUMINESCENT MATERIALS AND PROCESS
Mary V. Hoffman, South Euclid, Ohio, assignor to General Electric Company
Filed Apr. 6, 1970, Ser. No. 25,760
Int. Cl. C09k 1/04
U.S. Cl. 252—301.4 R   10 Claims

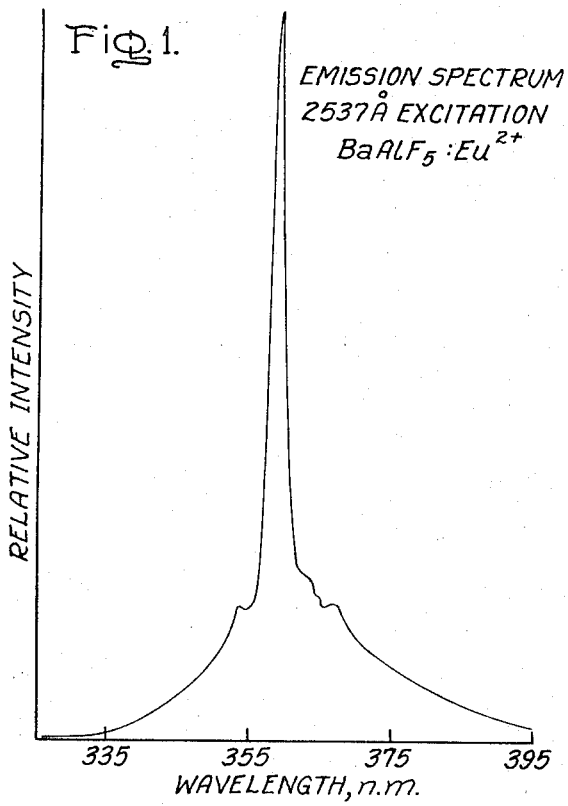
Fig. 1. EMISSION SPECTRUM 2537Å EXCITATION $BaAlF_5:Eu^{2+}$
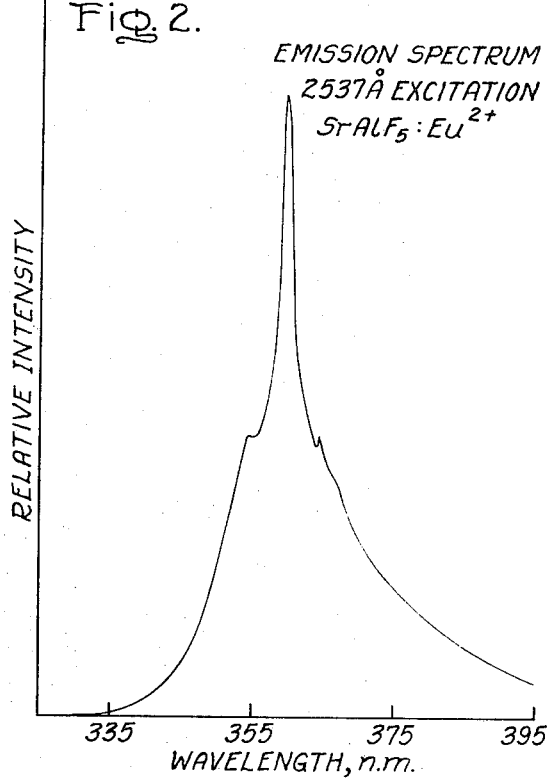
Fig. 2. EMISSION SPECTRUM 2537Å EXCITATION $SrAlF_5:Eu^{2+}$
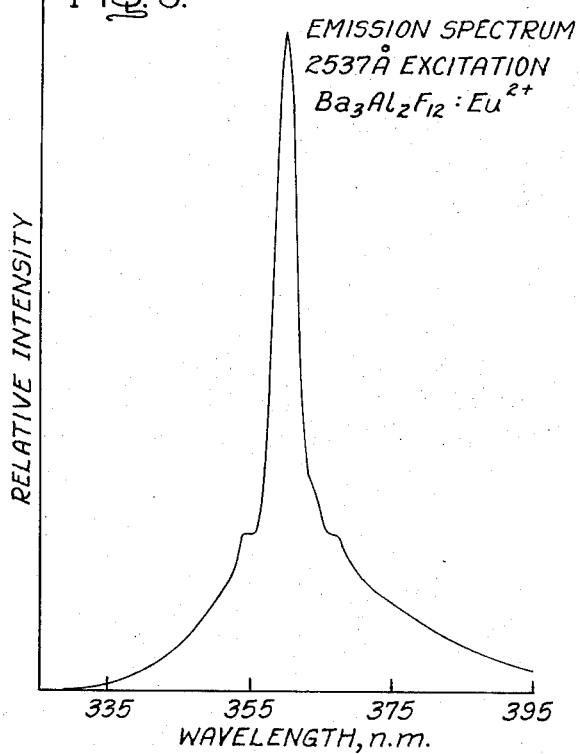
Fig. 3. EMISSION SPECTRUM 2537Å EXCITATION $Ba_3Al_2F_{12}:Eu^{2+}$
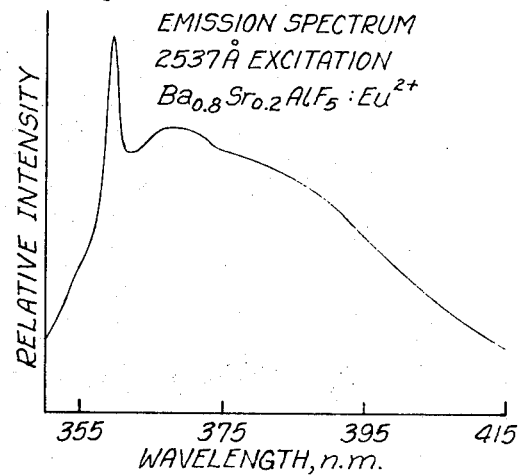
Fig. 4. EMISSION SPECTRUM 2537Å EXCITATION $Ba_{0.8}Sr_{0.2}AlF_5:Eu^{2+}$
Inventor:
Mary V. Hoffman
by *Richard A. Burgess*
Her Attorney United States Patent Office 3,630,945
Patented Dec. 28, 1971

ABSTRACT OF THE DISCLOSURE $SrAlF_5$, $BaAlF_5$, and $Ba_3Al_2F_{12}$, all activated with divalent europium substituting for the alkaline earth metal, are shown to be efficient producers of sharp line ultraviolet emission resulting from $4f$ to $4f$ energy level transitions in the divalent europium, as contrasted to previous luminescent materials utilizing divalent europium as an activator in which the emission is a band due to $5d$ to $4f$ transitions. Solid state and precipitation methods for producing these phosphors are disclosed. These materials are useful as phosphors in cathode ray tubes, lamps, and other applications.

BACKGROUND OF THE INVENTION

This invention relates to line emitting luminescent materials which produce ultraviolet radiation. More particularly, it relates to such materials which are specific alkaline earth aluminum fluorides activated with divalent europium.

Divalent europium as an activator in phosphors generally produces broad band emission through the blue and green portions of the visible spectrum.

Several alkaline earth aluminum fluoride compounds which are not activated to luminescence are known in the prior art. Also, some such fluorides are known to be capable of producing luminescence when activated with certain activators.

Sharp line emitters in the near ultraviolet region can be useful for certain purposes such as in photo-copying devices and possibly in lasers, and they can also be used for the same purposes as band emitters giving radiation in the same regions. There are some ultraviolet emitting materials available on the market, but they are not as efficient as would be desirable, and ultraviolet line emitters are not generally available. Also, the literature does not suggest suitable means for providing such more efficient materials.

SUMMARY OF THE INVENTION

It is an object of the present invention to provide efficient line emitting luminescent materials which emit in the near ultraviolet region. A further object is to provide processes for producing these materials.

Briefly stated, the present invention provides alkaline earth aluminum fluoride luminescent material activated to luminescence by divalent europium and selected from group consisting of the following: $M_{1-z}Eu_zAlF_5$ wherein: M=Sr, Ba, Sr+Ba, or $Sr_{1-y}Ca_y$ wherein $y \leq 0.5$; $x$ is from a small but effective amount to produce luminescence up to 0.30; and $M'_{3-z}Eu_zAl_2F_{12}$ wherein: M' is $Ba_{1-y'}+Sr_{y'}$ in which $y'$ is from zero up to about 0.1; and $z$ is from a small but effective amount to activate to luminescence up to 0.30.

The preferred concentrations of the divalent europium activator are in the range of 0.02 to 0.08 in each of the activated compounds of the invention. Percentages and proportions herein are given in molar quantities, except where indicated otherwise. The permissible variations in composition by substituting different alkaline earth elements as indicated above do not cause material changes in the structure of the compound, but can cause changes in the properties of the luminescent materials.

The invention also provides processes for producing these materials including a process of precipitating the mixed fluorides from a suitable solution by adding soluble fluorides such as $NH_4F \cdot HF$, and firing the product.

BRIEF DESCRIPTION OF THE DRAWING

FIG. 1 is a graph of the relative intensity over a range of wavelengths of $BaAlF_5:Eu^{2+}$ using 2537 angstrom units (A.) wavelength excitation. The spectral band width of 10 A. shows the general structure of the spectra, although it does not resolve out each of the individual lines which give rise to the peak, or the emission which make up its base structure. The notation in which the formula for a compound is given first, followed by a semicolon and the identification of the activator, indicates generally and in particular throughout this specification that the activator is incorporated into the compound in substitution for certain of its elements. In the compounds of the present invention, the divalent europium substitutes for proportional amounts of the alkaline earth metal.

FIG. 2 is a similar emission spectrum for $SrAlF_5:Eu^{2+}$.

FIG. 3 is a similar emission spectrum for $$Ba_3Al_2F_{12}:Eu^{2+}$$

FIG. 4 is a similar emission spectrum for $$Ba_{0.8}Sr_{0.2}AlF_5:Eu^{2+}$$

DESCRIPTION OF THE PREFERRED EMBODIMENTS

In phosphors of the invention according to the formula $MalF_5:Eu$ where M can be Sr or Ba, $SrAlF_5$ and $BaAlF_5$ have different structures, but both have an emission in which the $4f$—$4f$ transitions predominate. When M is a combination of Sr and Ba, with up to about 85% Ba in the Sr compound the result is a solid solution of Ba in the $SrAlF_5$ structure, which changes the size of the unit cell of the compound while retaining the same structure. Very small amounts such as a few percent of Sr can be accommodated in the Ba compound and do not change the structure. In the $Sr_{1-x}Ba_xAlF_5:Eu^{2+}$ phosphor with $x$ up to 0.85, the addition of Ba results in an emission consisting of both the $4f$ to $4f$ line emissions and the $5d$ to $4f$ band emissions of divalent europium. In the $MalF_5$ compounds, when M is Sr, up to one-half of the Sr can be substituted by Ca, with a similar change occurring in the structure and in the emission.

In the $M'_3Al_2F_{12}:Eu$ compound, M' is primarily Ba with some permissible substitution of Sr for Ba without material change in the luminescent characteristics of the resulting product.

The emission spectra of the three principal phosphors of the invention are shown in FIGS. 1–3, and the emission spectrum of a mixed phosphor is shown in FIG. 4, as discussed above. Resolved spectra show large numbers of individual lines making up both the peaks and part of the bases of the peaks in the spectra. Parts of the bases also consist of some emission from $5d$ to $4f$ band transitions. In the $SrAlF_5:Eu$ phosphor, the spectrum as shown in FIG. 2 consists of $4f$ to $4f$ lines superimposed on the $5d$ to $4f$ band emission. In the phosphors $BaAlF_5:Eu$ and $Ba_3Al_2F_{12}:Eu$, most of the emission is from the $4f$ to $4f$ lines and little or none can be detected from $5d$ to $4f$ band transitions. The spectra in FIGS. 1 and 3 show less emission in the base structure and a greater amount of emission in the line, when comapred with FIG. 2.

The type of spectra obtained from the phosphors $MAlF_5$ where M is a mixture of Sr+Ba or Sr+Ca is illustrated in FIG. 4. In these phosphors, the addition of a different alkaline earth cation changes the energy level transitions to introduce more emission from the 5d to 4f levels, and further, this emission is at different wavelengths from the 5d to 4f emission found in the SrAlF$_5$:Eu phosphor. This change in emission with slight changes in composition illustrates the sensitivity of the 4f—4f transitions of Eu$^{2+}$ to the structural position in which the Eu$^{2+}$ is found. Generally, these phosphors absorb exciting energy at least to some extent in the 5d band and then, if the 5d band is enough above the energy levels of the 4f band, the energy is transmitted to the 4f band. Transitions within the 4f band apparently produce the line emission which is characteristic of the materials of the present invention.

This emission behavior in terms of energy level transfers is very unusual and scientifically interesting as well as of potential commercial value in various fields.

Two types of methods have been devised for preparing the luminescent materials of the invention. Examples given hereinafter show the preparation of these materials with the Eu$^{2+}$ activator level at 0.02 mole. Both the solid state and the precipitation methods can be used to effectively produce the materials when the alkaline earth metal used is Sr or Ba or both together. When Ca is also present in the MAlF$_5$ compounds, only the solid state method is preferred.

In the solid state method, the quantities of ingredients indicated below in Table I can be used to prepare each of the phosphors shown.

TABLE I.—SOLID STATE METHOD INGREDIENTS

|  | BaAlF$_5$ | | SrAlF$_5$ | | Ba$_3$Al$_2$F$_{12}$ | |
| --- | --- | --- | --- | --- | --- | --- |
|  | Grams | Moles | Grams | Moles | Grams | Moles |
| BaF$_2$ | 17.18 | 0.098 |  |  | 51.55 | 0.294 |
| SrF$_2$ |  |  | 12.31 | 0.098 |  |  |
| EuF$_3$ | 0.418 | 0.002 | 0.418 | 0.002 | 1.25 | 0.006 |
| AlF$_3$ | 8.39 | 0.100 | 8.39 | 0.100 | 16.79 | 0.200 |

BaF$_2$ and SrF$_2$ are available commercially. AlF$_3$ is prepared by firing Al$_2$O$_3$ in anhydrous HF at temperatures in the range of 700–800° C. for several hours. EuF$_3$ is prepared from Eu$_2$O$_3$ by similar firings in a temperature range of 900–1000° C. The preferred source of EuF$_3$, BaF$_2$, and SrF$_2$ is first prepared as a coprecipitate of the carbonate or oxalate, combining Eu with Sr or Ba in the proportions required. This carbonate or oxalate is fired in air to the oxide and then refired in anhydrous HF at 800–900° C. to produce a mixture of the BaF$_2$ or SrF$_2$ with the EuF$_3$. The alkaline earth europium fluoride is then mixed with the aluminum fluoride, either dry or in acetone. The mixed materials are then first fired in a gas consisting of nitrogen with about 1% hydrogen at about 800° C. for several hours such as 4 hours to form the desired compounds and to incorporate europium in the divalent state. The divalent alkaline earth metals in these compounds facilitate the incorporation of the europium in the divalent state, and the trivalent aluminum minimizes the likelihood of the europium being present in the trivalent state. The material is then fired a second time, this time in anhydrous HF at 700–800° C. for several hours such as 750° C. for 2 hours. The HF atmosphere used in all instances is preferably 30–50% HF in N$_2$ by volume. As is known in the art, platinum boats, hardware and atmosphere chambers are preferably used for HF firing of these materials.

In addition to the solid state preparation described above, these materials may alternately be prepared by a precipitation procedure using the ingredients indicated in Table II below in gram quantities, sufficient to produce the molar amounts equivalent to those shown in Table I.

TABLE II.—PRECIPITATION METHOD INGREDIENTS

|  | BaAlF$_5$ | SrAlF$_5$ | Ba$_3$Al$_2$F$_{12}$ |
| --- | --- | --- | --- |
| Ba(NO$_3$)$_2$ | 22.43 |  | 67.25 |
| Sr(NO$_3$)$_2$ |  | 20.74 |  |
| Al(NO$_3$)$_3$·9H$_2$O | 37.5 | 37.5 | 75.02 |
| Eu$_2$O$_3$ | 0.35 | 0.35 | 1.05 |
| NH$_4$F·HF | 14.16 | 14.16 | 34.23 |

All of these materials are commercially available.

The Eu$_2$O$_3$ is dissolved in dilute HNO$_3$. All the other ingredients are dissolved in about 400 milliliters (ml.) H$_2$O for each material, and the alkaline earth metal, Al and Eu nitrate solutions are combined by pouring them together. The solution is heated to 70–90° C. and the pH is adjusted to between 6 and 7 by adding NH$_4$OH as required. The fluoride solution is then added to the nitrate solution, forming a precipitate. This is heated for a sufficient time to digest the precipitate and produce larger crystals that can be filtered more effectively. From 20 minutes to several hours at 70–90° C. is effective for digestion, depending on the particle size sought. Then it is filtered, washed with water and dried. The same firing procedure is used as was described above for the solid state procedure.

As will be apparent to those skilled in the art, for the precipitation procedure, subsequent difficulties from excess fluoride can be avoided by using a slight deficiency of fluoride in the ingredients to assure stoichiometric products without excess fluorides. For BaAlF$_5$:Eu and SrAlF$_5$:Eu, a convenient amount of fluorides for the precipitation ingredients is slightly less than the theoretical such as about 90–95% of the amounts indicated in the above descriptions which are calculated to provide essentially stoichiometric materials. For Ba$_3$Al$_2$F$_{12}$:Eu, the fluoride quantity is equal to or more than theoretical, such as 100–110% of stoichiometric, to assure formation of the desired compounds.

Since AlF$_3$ cannot be precipitated effectively or with good control, it was a surprise to find that the precipitation method of the present invention was successful in producing such good material. Apparently the precipitation produces some type of hydrated alkaline earth aluminum fluoride which converts to the desired materials of the invention on subsequent firing of the mixed fluorides precipitated together.

Although nitrate solutions are quite satisfactory for the precipitation process of the invention, other types of solutions can also be used. Chloride solutions of Sr and Ca constituents are suitable, although they would not be as desirable for producing Ba fluoride materials because of the formation of barium chloro-fluoride compounds.

The foregoing is a description of illustrative embodiments of the invention, and it is applicant's intention in the appended claims to cover all forms which fall within the scope of the invention.

The emissions of these materials have been measured in applications such as fluorescent lamps and also under cathode ray excitation. When compared with standard ultraviolet emitting phosphors such as Pb-activated barium silicates (blacklight phosphor), the energy output in the ultraviolet is generally higher for the line emitting Eu$^{2+}$ activated fluorides of the invention with cathode ray of 2537 A. excitation.

What I claim as new and desired to secure by Letters Patent of the United States is:

1. Alkaline earth aluminum fluoride luminescent material activated to luminescence by divalent europium and selected from the group consisting of the following:

(a) M$_{1-x}$Eu$_x$AlF$_5$ wherein M=Sr, Ba, Sr+Ba, or Sr$_{1-y}$Ca$_y$ wherein y $\leq$0.5, and x is from a small but effective amount to produce luminescence up to 0.30, and (b) M'$_{3-z}$Eu$_z$Al$_2$F$_{12}$ wherein M' is Ba$_{1-y'}$+Sr$_{y'}$ in which y' is from zero up to about 0.1, and z is from a small but effective amount to activate to luminescence up to 0.30.

2. A luminescent material according to claim 1 having essentially the formula: Sr$_{1-x}$Eu$_x$AlF$_5$ wherein x is from a small but effective amount to produce luminescence up to 0.30.

3. A luminescent material according to claim 1 having essentially the formula: Ba$_{1-x}$Eu$_x$AlF$_5$ wherein x is from a small but effective amount to produce luminescence up to 0.30.

4. A luminescent material according to claim 1 having essentially the formula: $Ba_{3-z}Eu_zAl_2F_{12}$ wherein $z$ is from a small but effective amount to activate to luminescence up to 0.30.

5. A luminescent material according to claim 2 having essentially the formula: $Sr_{1-x}Eu_xAlF_5$ wherein x is between 0.02 and 0.08.

6. A luminescent material according to claim 3 having essentially the formula: $Ba_{1-x}Eu_xAlF_5$ wherein $x$ is between 0.02 and 0.08.

7. A luminescent material according to claim 4 having essentially the formula: $Ba_{3-z}Eu_zAl_2F_5$ wherein $z$ is between 0.02 and 0.08.

8. A process for producing the material of claim 1 wherein a solution of the desired proportions of alkaline earth metal, aluminum, and europium constituents is prepared, and a soluble fluoride is added to said solution to precipitate mixed fluorides of said constituents, and said mixed fluorides are digested to increase their particle size and then dried and fired to produce the desired materials.

9. A process according to claim 8 wheerin said soluble fluoride is $NH_4F \cdot HF$.

10. A process according to claim 8 wherein said solution of constituents is a nitrate solution.

References Cited

UNITED STATES PATENTS

| | | | |
|---|---|---|---|
| 2,372,071 | 3/1945 | Fernberger | 252—301.4 S |
| 2,450,548 | 10/1948 | Gisolf et al. | 252—301.4 R |
| 2,746,933 | 5/1956 | Smith | 252—301.4 R |
| 3,448,056 | 6/1969 | Chenot | 252—301.4 R |

ROBERT D. EDMONDS, Primary Examiner